July 8, 1952 P. J. BRESCIANI 2,602,562
MACHINE FOR ASSEMBLING AND SECURING PARTS
Filed Nov. 2, 1946 3 Sheets-Sheet 1
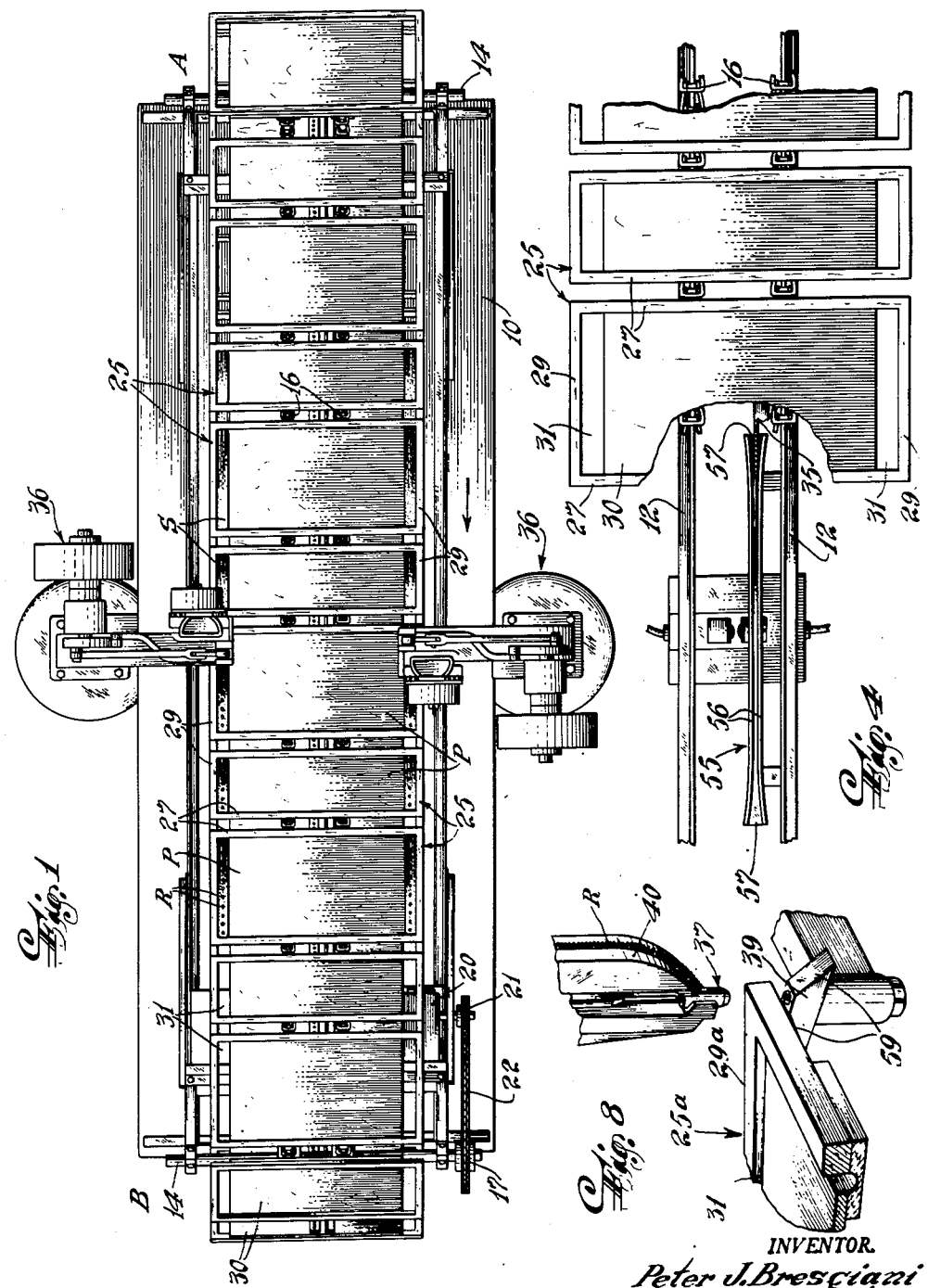
INVENTOR.
Peter J. Bresciani
BY
ATTORNEY July 8, 1952 P. J. BRESCIANI 2,602,562
MACHINE FOR ASSEMBLING AND SECURING PARTS
Filed Nov. 2, 1946 3 Sheets-Sheet 2
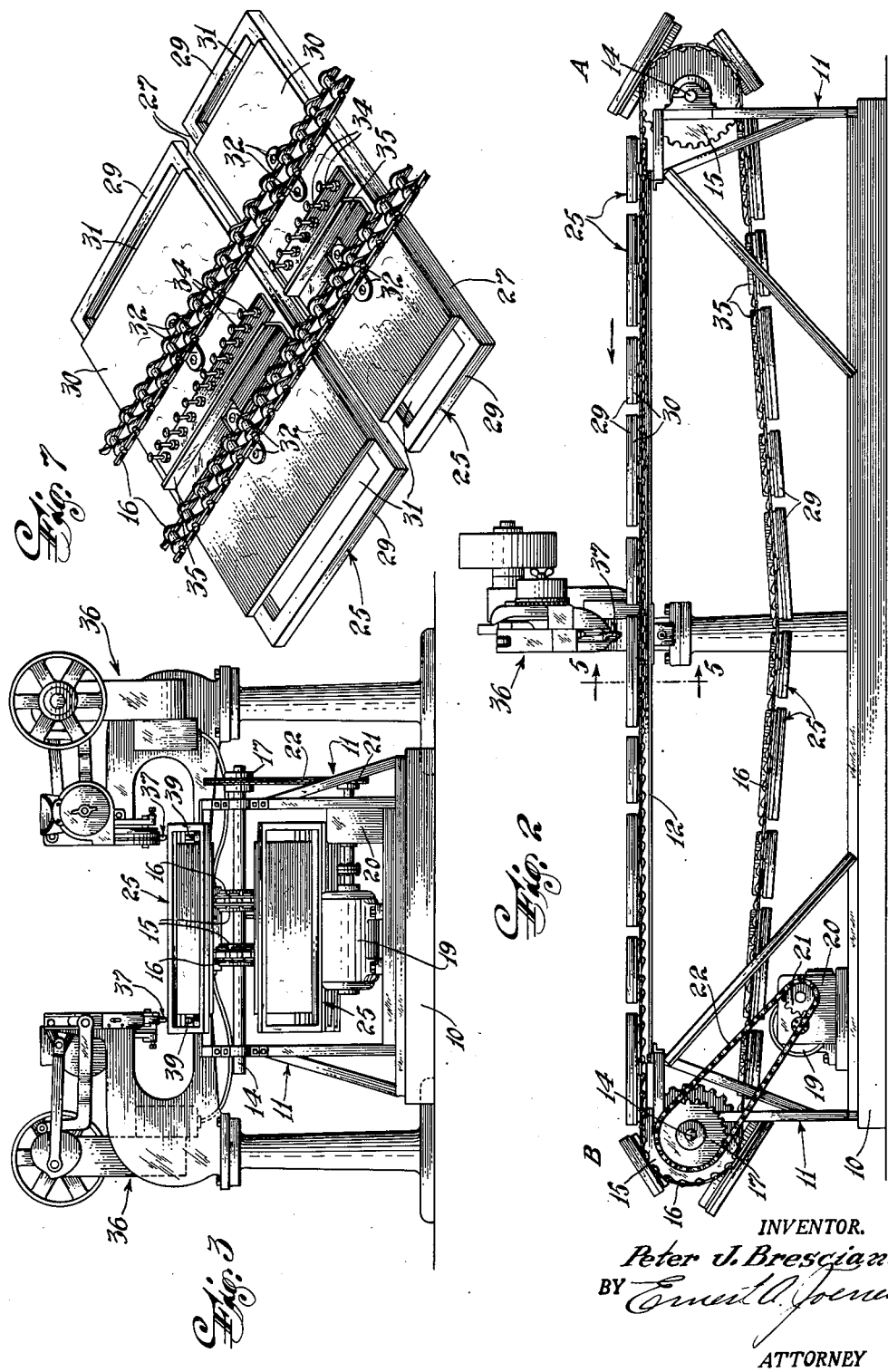
INVENTOR.
Peter J. Bresciani
BY
ATTORNEY July 8, 1952 P. J. BRESCIANI 2,602,562
MACHINE FOR ASSEMBLING AND SECURING PARTS
Filed Nov. 2, 1946 3 Sheets-Sheet 3
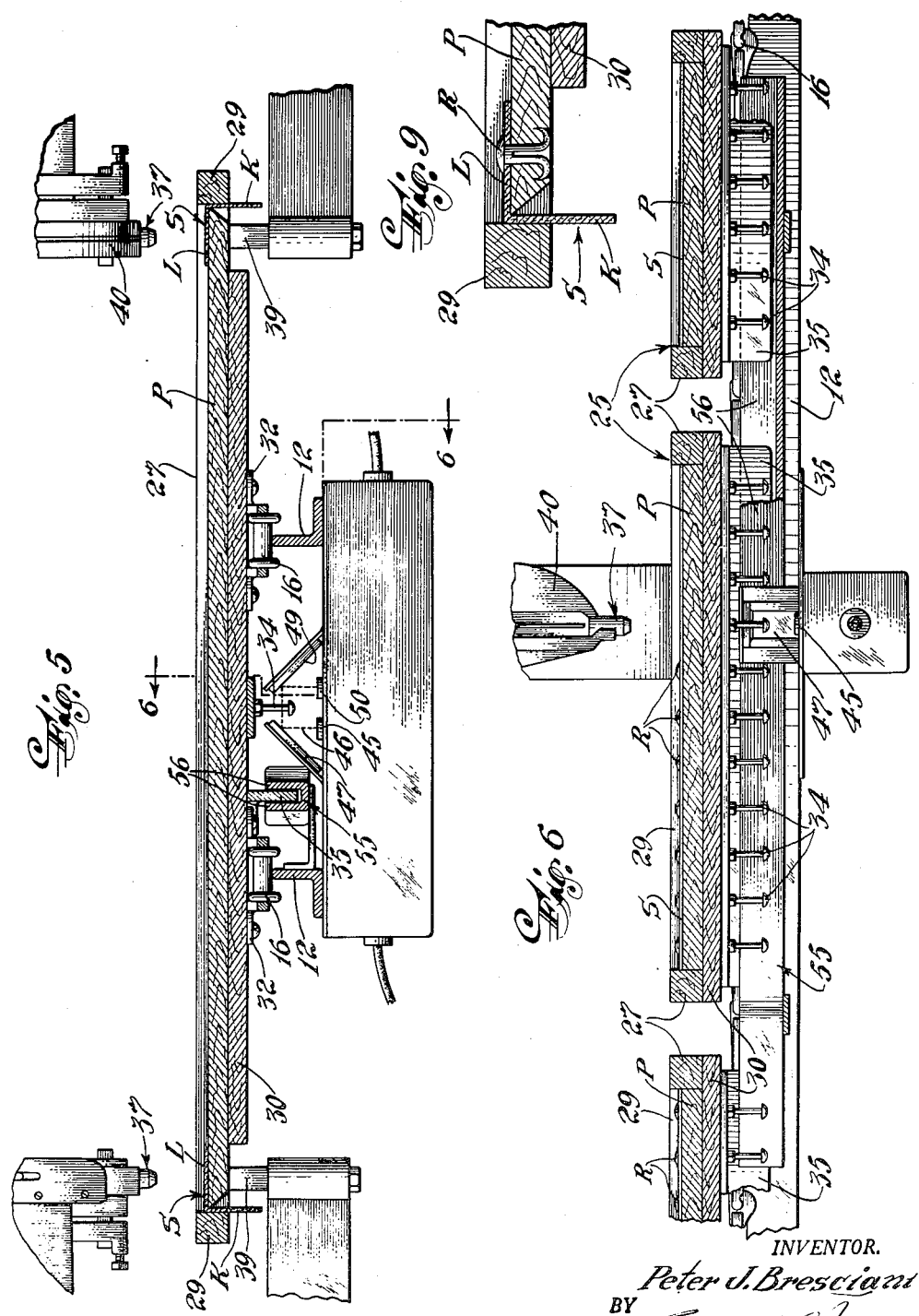
INVENTOR.
Peter J. Bresciani
BY
ATTORNEY Patented July 8, 1952

2,602,562

UNITED STATES PATENT OFFICE 2,602,562

MACHINE FOR ASSEMBLING AND SECURING PARTS

Peter J. Bresciani, New York, N. Y.

Application November 2, 1946, Serial No. 707,363

3 Claims. (Cl. 218—0.5)

1

The present invention relates to the assembling of parts of receptacles such as trunks or the like, and more particularly to an automatic machine for effecting such assembling operations.

The machine in accordance with the invention is particularly applicable for assembling parts of trunks or other receptacles having side members to be joined to end members and to top or bottom members by angle strips which are riveted to the members.

Heretofore it has been customary to perform these operations by having an operator present the parts to be riveted to a riveting machine and effect operation of the machine by a foot treadle or the like each time the parts were in position to receive a rivet. The difficulty with the foregoing method is that it is time consuming, is expensive due to the labor cost involved, and results in imperfect work because the fixing of the rivets is subject to errors by the operator in positioning the parts.

The present invention aims to overcome the foregoing difficulties and objections by providing an automatic machine for riveting angle strips to the side, top and bottom members of trunks and the like, which machine is extremely rapid in operation and accurately fixes the rivets in predetermined positions.

An object of the present invention is greatly to reduce the cost of assembling the parts of trunks and the like by providing an automatic machine which eliminates direct labor costs and requires a minimum of supervision, maintenance and repair.

Another object is to provide a machine wherein the parts to be riveted are automatically conveyed past the riveting station.

Another object is to provide a machine wherein the parts to be riveted are accurately positioned with respect to the riveting machine.

Another object is to provide a machine wherein the rivets secure the parts at predetermined spaced locations.

Another object is to provide a machine wherein the parts to be riveted are positioned with respect to means which determine the actuation of the riveting machine at desired intervals.

Another object is to provide a machine wherein the parts to be riveted are automatically conveyed over the riveting anvil.

Another object is to provide a machine wherein the parts to be riveted are held against lateral movement while being conveyed past the riveting station.

A further object is to provide a jig for holding

2 the parts to be riveted in a predetermined assembled position.

A still further object is to provide a jig of the foregoing character having means for cooperating with means for effecting actuation of the riveting machine.

Other and further objects of the invention will be obvious upon an understanding of the illustrative embodiment about to be described, or will be indicated in the appended claims, and various advantages not referred to herein will occur to one skilled in the art upon employment of the invention in practice.

The machine in accordance with the present invention generally comprises a continuous conveyor, jigs or frames carried by the conveyor for holding the parts to be riveted in a predetermined assembled relation, and a riveting machine at either or both sides of the conveyor actuated automatically in response to means associated with the jigs whereby the rivets are applied and fixed at predetermined spaced locations. Means are provided for raising the jigs to enable them to pass over the riveting anvil and to enable the parts to be riveted to ride on the anvil as they pass the riveting station. Means are also provided for laterally aligning the jigs with respect to the riveting head and for preventing lateral movement thereof as they are conveyed past the riveting machine.

A preferred embodiment of the invention has been chosen for purposes of illustration and description, and is shown in the accompanying drawing, forming a part of the specification, wherein:

Figure 1 is a top plan view of a machine illustrating the present invention.

Figure 2 is a side elevational view of the machine with one of the riveting machines removed.

Figure 3 is an end elevational view of the machine.

Figure 4 is an enlarged fragmentary plan view with parts broken away to illustrate details of the machine.

Figure 5 is a sectional view taken along the line 5—5 on Figure 2.

Figure 6 is a sectional view taken substantially along the line 6—6 on Figure 5.

Figure 7 is a bottom perspective view of the jigs for holding the parts to be riveted.

Figure 8 is a fragmentary perspective view illustrating means for raising the jigs to permit the parts to be riveted to pass over the anvil of the riveting machine.

Figure 9 is an enlarged sectional view illustrating an angle strip riveted to a trunk member and being held in a jig.

Referring to the drawings in detail, there is shown in Figures 1, 2 and 3 a machine, the frame of which comprises a base 10, upright supporting members 11 on each end of the base at each side thereof, and a pair of parallel horizontal lengthwise extending members 12 supported by the upright members 11.

Axles 14 are journalled between the horizontal members 12 at each end which each carry a pair of spaced sprockets 15 adapted to move an endless chain 16 in a lengthwise direction. Each chain extends across and is supported by one of the horizontal members 12 (Figure 5).

One of the axles 14 extends outwardly from the frame (Figure 3) and has a sprocket 17 thereon which is driven by a motor 19 mounted on the base, through the intermediation of a speed reducing gear box 20, a sprocket 21, and a chain 22 connecting the sprockets 17 and 21 (Figure 2).

The chains 16 which serve as a conveyor carry a plurality of closely spaced jigs or frames 25 adapted to hold the work to be riveted. As shown in Figures 4 and 7, the jigs comprise a rectangular frame portion having sides 27 and ends 29 and a bottom 30 having its ends spaced from the ends 29 of the frame portion to provide slots or openings 31 for the purpose described herinafter. The jigs shown herein are of two widths, are arranged alternately, thus permitting angle strips to be applied, for example, to the top and bottom and the side parts of a trunk on the same machine.

The underside of the bottom 30 is attached to suitable lugs 32 (Figure 7) carried by the chains 16 which permit slight tilting movement of the jigs in a lengthwise direction with respect to the chains 16. The underside of the bottom 30 also has secured thereto a row of spaced depending members such as pins 34 between the chains 16 and parallel thereto and has secured thereto a track 35 in the form of an angle strip which has a depending leg positioned between the row of pins 34 and one of the chains 16 and parallel thereto. The purpose of the pins and the track will become apparent hereinafter.

As shown in Figures 1 and 3 a riveting machine 36 is provided at each side of the conveyor directly opposite each other and having a riveting head 37 and an anvil 39 which are positioned above and below the slots 31 in the jigs, respectively (Figure 5). The riveting machine is of a standard type being power driven and equipped with a clutch for connecting the riveting head to the source of power to effect instantaneous operation thereof. The rivets R are fed by gravity to the riveting head by a slide 40 (Figure 8).

In order to render the riveting machine automatic in operation, the clutch is placed in driving relation by means of a solenoid which is energized by current controlled by switch means responsive to the position of the pins 34. The means for controlling the actuation of the riveting machine as illustrated (Figure 5) comprises a source of light 45 for directing a beam of light 46 against a reflector 47 which cause the beam to pass transversely across the path of the pins, a second reflector 49 against which the transverse portion of the beam is directed and which in turn directs the beam to a photoelectric cell 50, and amplifying means of the conventional design which control the flow of current to the clutch actuating solenoids.

Each time a pin breaks the beam, the clutches of both riveting machines are actuated simultaneously to effect operation of the riveting machines, whereby a rivet is set in the parts to be secured at each side thereof in substantially perfect alignment with each other.

Since the photoelectric cell arrangement, the clutch solenoids and the control circuits therefor are of conventional design and are well known, a detailed description and illustration thereof is believed to be unnecessary.

It will be understood that instead of the foregoing photoelectric cell arrangement arms which operate make and break switches, for example, micro-switches, could be positioned in the path of the pins.

In order to hold the jigs and the parts therein against lateral movement while being presented to the riveting machine and to present the parts in a predetermined position with respect to the riveting head in an accurate manner, a guideway 55 is supported by one of the horizontal members 12 adjacent the riveting station and receives therein the tracks 35 on the bottom of the jigs. The guideway comprises a pair of spaced parallel members 56 (Figures 4 and 5) extending lengthwise with respect to the conveyor and having outwardly flared ends 57 to facilitate receiving the ends of the tracks and guiding them between the intermediate portions of the members 56.

In Figure 8 a modified form of jig 25a is shown having ends 29a, the lower edges of which ride at a lower level than the upper surface of the anvil. In order to raise the ends of the frame portions over the anvils to permit the parts to be riveted to ride on the anvils, each anvil has a cam or incline 59 at the forward and rearward ends. The cams are contacted by the forward ends of the frame portions whereupon the jigs are tilted upwardly and the ends 29a ride over the anvils and are lowered again so that the parts to be riveted are supported by the anvils. The rearward ends 29a of the frame portions are likewise raised and lowered over the anvils as the jigs leave the riveting station. The raising and lowering of the jigs is effected without interruption of the forward movement thereof.

In operation, the parts to be riveted are placed manually into the jigs at the station A at one end of the machine (Figures 1 and 2). This is accomplished by placing the side, top or bottom parts P into frame portions which substantially conform to the size and shape of the parts and hold the same against substantial sidewise or endwise movement while the parts rest on the bottom 30 of jig (Figures 5 and 9). The angle strips S are positioned so that one leg L lies flat over the end portions of the parts P and the other leg K extends downwardly through the slots 31 of the jig.

As the jigs approach the riveting machines, the tracks 35 enter the guideway 55 to align the jigs and the strips S and parts P with respect to the riveting head. If jigs as shown in Figure 8 are utilized, the ends 29a are raised and moved across the anvils and are lowered again so that the parts P are supported by the anvils.

When the jigs have been moved into the foregoing position, the pins 34 commence to break the beam to effect operation of the riveting machines. Each time the beam is broken a rivet is set at each side of a part P to secure the strip S thereto. The riveting machine is extremely rapid in operation to provide for instantaneous setting of the rivet, whereby the distance of lengthwise movement of part P is so small that the rivet R is set in a vertical position.

The rivets illustrated herein (Figure 9) are of the split shank type, however it will be understood that other types of rivets or staples are adapted to be used in connection with the machine of the present invention.

As the riveted parts (Figures 1 and 6) move away from the riveting station, they are conveyed to station B at the other end of the machine where they are removed manually from the jigs.

While the machine has been described in connection with securing trunk parts, it will be understood that the machine is adaptable for securing other parts without departing from the present invention.

From the foregoing description it will be seen, that the present invention provides a simple practical machine for securing parts at a rapid rate and without the aid of skilled labor. By reason of the automatic features, the rivets are set at predetermined spaced and aligned locations in an accurate manner. The machine is rugged in construction and can readily withstand any rough usuage to which it may be subjected.

As various changes may be made in the form, construction and arrangement of the parts herein, without department from the spirit and scope of the invention and without sacrificing any of its advantages, it is to be understood that all matter herein is to be interpreted as illustrative and not in any limiting sense.

I claim:

1. In apparatus for securing a plurality of parts together including a machine for effecting securement of the parts rendered operative upon the interruption of a light beam directed on a photoelectric cell which controls the actuation of a driving connection of the machine, the combination of an endless conveyor having its upper strand positioned to move in a direction substantially perpendicular to the light beam, a plurality of frames on said conveyor each having a base for supporting a sheet part in substantially horizontal position and a side portion for engaging one flange of an angle strip part to hold the other flange of the strip part in overlapping position on a marginal portion of the sheet part, said frames being so positioned with respect to the machine that the parts are positioned in the aforesaid assembled relationship for presenting the same to the machine to be secured in said relationship, and a plurality of elements depending from the underside of the base of each of said frames and being spaced in the direction in which said conveyor is moved and being positioned for interrupting the light beam.

2. In apparatus for riveting angle strips to sheets including an anvil and a riveting machine having a riveting element in alignment with the anvil adapted to be rendered operative upon the interruption of a light beam directed on a photoelectric cell which controls the actuation of a driving connection of the machine to render the riveting element operative, the combination of an endless conveyor having its upper strand positioned to move in a direction substantially perpendicular to the light beam, a plurality of frames on said conveyor each having a base for supporting a sheet in substantially horizontal position and one flange of an angle strip in overlapping relation with the sheet at one side edge thereof, said base being provided with a slot at one side thereof over which the sheet is positioned and said frames being positioned so that said slots pass between the anvil and the riveting element to facilitate riveting of the sheets and strips, and a plurality of depending elements on said base spaced in the direction in which said conveyor is moved and positioned for interrupting the light beam.

3. Apparatus according to claim 2, wherein said frames have rectangular walls extending upwardly from said base for receiving a rectangular sheet.

PETER J. BRESCIANI.

REFERENCES CITED

The following references are of record in the file of this patent:

UNITED STATES PATENTS

| Number | Name | Date |
| --- | --- | --- |
| 207,626 | Sargent | Sept. 3, 1878 |
| 580,114 | Loughridge | Apr. 6, 1897 |
| 1,282,714 | Palmer | Oct. 22, 1918 |
| 1,407,576 | Prym | Feb. 21, 1922 |
| 1,461,014 | Landers | July 3, 1923 |
| 1,471,558 | Hopkins | Oct. 23, 1923 |
| 1,504,891 | Hill | Aug. 12, 1924 |
| 1,532,110 | Loy | Mar. 31, 1925 |
| 1,532,111 | Loy | Mar. 31, 1925 |
| 1,572,364 | Rose | Feb. 9, 1926 |
| 1,653,741 | Solem | Dec. 27, 1927 |
| 1,692,832 | Harrison | Nov. 27, 1928 |
| 1,800,567 | Poole | Apr. 14, 1931 |
| 2,157,283 | Dyson | May 9, 1939 |
| 2,257,379 | Havener | Sept. 30, 1941 |
| 2,374,464 | Skriba | Apr. 24, 1945 |
| 2,405,879 | Fredericksen | Aug. 13, 1946 |
| 2,443,877 | Vacin | June 22, 1948 |